June 11, 1929.　　　W. A. KOSKEN　　　1,717,044
ADJUSTING MECHANISM FOR LIGHT DEFLECTORS
Filed Nov. 25, 1927
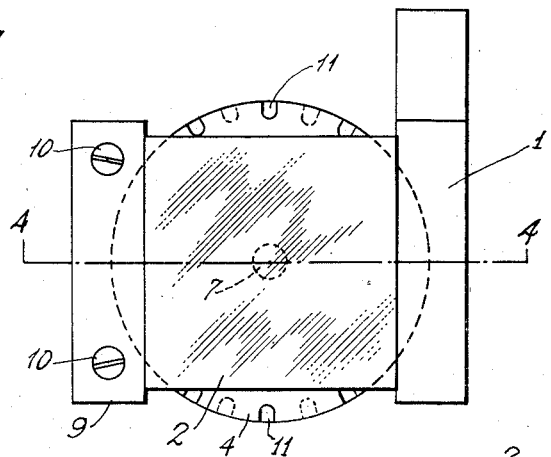
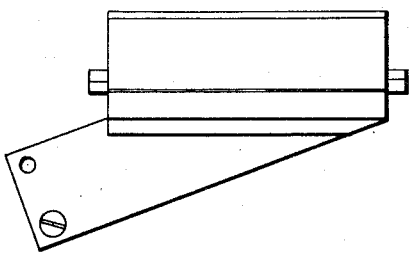
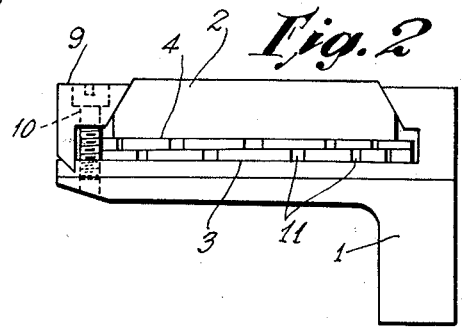
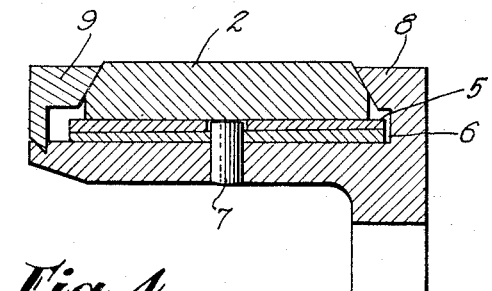
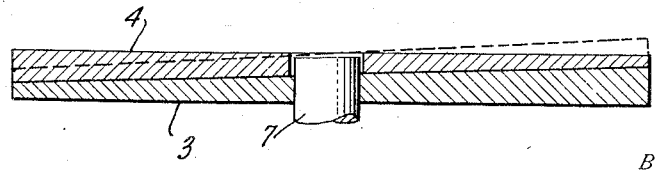
INVENTOR.
Wilho A. Kosken
BY Cornelius Zabriskie
ATTORNEYS.

Patented June 11, 1929.

UNITED STATES PATENT OFFICE.

WILHO A. KOSKEN, OF BROOKLYN, NEW YORK, ASSIGNOR TO STEADYLITE MOTION PICTURE MACHINE CORPORATION, OF NEW YORK, N. Y., A CORPORATION OF NEW YORK.

ADJUSTING MECHANISM FOR LIGHT DEFLECTORS.

Application filed November 25, 1927. Serial No. 235,468.

This invention relates to adjusting mechanism particularly intended for use in conjunction with light deflectors employed in motion picture machines, although adapted for other purposes.

In motion picture machines where a light beam is passed from a film to an objective or vice versa, it is frequently desired to bend the beam of light within the camera or projector. This is generally accomplished by means of deflectors which, in order to function properly, must be accurately adjusted to produce correct angles of incidence and reflection. Accurate adjustments are essential in this connection and complicated mechanisms have been heretofore suggested for this purpose.

The object of the present invention is to provide for the adjustments by simple and efficient mechanism so constituted as to permit perfect adjustment.

Speaking generally, the invention consists in a plurality of coaxial disks constituting a disk stack and mounted for relative rotation and positioned between a relatively fixed support and the body which it is desired to adjust with relation to such support. The adjacent faces of the support and body between which the disks are positioned are flat, plane surfaces, while the disks are of tapered cross section. Suitable means is provided for mounting the body on the support with one face of the body in engagement with the stack of disks and with the axis of said stack extending substantially centrally through the body. It is found that by imparting relative rotation to the disks, a tilting movement may be imparted to the body in any direction, so that the movement of the body may be said to be substantially universal.

It therefore follows that adjustment of the body to a horizontal position or to any predetermined inclination within fixed limits may be accomplished by relatively rotating the disks as stated. The limits of adjustability are controlled by the thickness of the disks and this taper will of course vary according to the particular environment in which the invention is to be used. However, when employed in connection with optical systems, such as are used in a motion picture machine, adjustments of a few thousandths of an inch are generally sufficient so that the taper of the disks may be relatively slight in order to accomplish the desired result.

An important practical feature of this invention resides in the fact that an absolutely accurate adjustment may be obtained by an unusually simple and relatively inexpensive construction.

Features of the invention, other than those specified, will be apparent from the hereinafter detailed description and claims, when read in conjunction with the accompanying drawings.

The accompanying drawing illustrates one practical embodiment of the invention, but the construction therein shown is to be understood as illustrative, only, and not as defining the limits of the invention.

Figure 1 is a plan view of a deflector mounting for a motion picture machine.

Figure 2 is a side elevation of the construction shown in Figure 1.

Figure 3 is an edge elevation of said construction.

Figure 4 is a section on the line 4—4 of Figure 1.

Figure 5 is an enlarged diagrammatic view illustrating the manner in which the disks are adjustable to vary the inclination of the deflector.

For the purpose of illustrating this invention, I have shown the same in the accompanying drawings as incorporated in a deflector mounting of the character employed in motion picture projecting machines embodying continuously moving deflectors cooperating with a continuously moving film. A beam of light is passed through the film and bent by the deflectors, generally a plurality of times, before passing through the objective lens. In a machine of this character, it is absolutely essential that the deflectors be accurately inclined on their respective mountings in order that the beam will properly impinge the deflectors in succession and be bent at such angle as to pass the image through the objective lens without distortion. The mounting of the deflectors has constituted a very serious problem in machines of the type referred to and because of the accuracy of adjustment required, the present invention is particularly adapted for use in this connection.

Referring to the drawings, 1 designates a deflector mounting which will be hereinafter termed a relatively fixed support for it is with reference to this support that the deflector, designated 2, is adapted to be adjusted. The deflector 2 is a light reflecting or deflecting body and may be a mirror of any suitable character, a prism or any other light reflecting element. The support and deflector may be of any suitable shape depending upon machine design. It is essential to the present invention, however, that the support be provided with a suitable seat 3 and that the deflector body 2 be provided with a flat seat or surface 4. Between the seats 3 and 4 is positioned a stack of disks. Any number of disks may be utilized, but two are found to give thoroughly satisfactory results. The two disks illustrated in the drawings are designated 5 and 6. They are of substantially circular contour and are supported coaxially on a pin 7 carried by the fixed support as shown best in Figure 4.

The pin is firmly secured to the support and extends loosely through the disks as shown in this figure. The disks rest upon the seat 3, while the body 2 rests upon the disk stack and is held in engagement therewith in any suitable manner. A convenient way of holding the body 2 in position is shown in the drawings as embodying two flanges 8 and 9, the former of which is formed rigid with the support 1 and the latter of which is made separate from the support and is secured thereto by screws 10. The flanges 8 and 9 are undercut on a bevel and the corresponding edges of the body 2 are complementarily shaped, so that when the screws 10 are tightened to draw the flange 9 against the body, the body will be clamped by flanges 8 and 9 and held down firmly on the disk stack.

It is of utmost importance that the disks 5 and 6 be made otherwise than flat. In other words, the upper and lower faces of each disk must be otherwise than parallel and, in practice, I prefer to slightly taper each disk diametrically, so that at one point in its circumference each disk is of greater thickness than at the diametrically opposite point in its circumference. Each face of each disk is however preferably a plane surface.

As a result of this construction, it will be apparent that when the disks are relatively rotated beneath the body 2, the body will be tilted in one direction or the other dependent upon the direction of rotation of the disks and the degree of angularity of rotation. It will of course be understood that the screws 10 are loosened sufficiently during manipulation of the disks to permit the adjustment of the body as specified, and I have found that the beveling of the flanges and body as shown well adapt the construction to adjustment of the body by rotation of the disks.

To facilitate rotation of the disks, they are preferably provided with notches 11 in their outer peripheries and in these notches a wrench or other implement may be inserted to rotate the disks. Furthermore, the respective notches may bear designations A, B, C, etc. in order that when a person is adjusting the disks, he may ascertain and make note of the relative positions of such disks. After the disks have been rotated to incline or level the body 2, the screws 10 are tightened to clamp the parts firmly against inadvertent shifting. The degree to which the body 2 is adjusted will of course depend upon the taper of the disks. If a relatively large amount of adjustment is desired, in the construction, the taper may be relatively abrupt or more than two disks may be employed. For use in optical systems, however, the taper of a few thousandths of an inch is adequate to obtain the adjustments necessary.

I wish to call particular attention to the marked simplicity of the present construction. Numerous devices have been heretofore suggested for making adjustments of the character under consideration, but none of them have even approached the present invention from the standpoint of simplicity. All prior constructions generally embody a large number of moving parts which have to be machined with the greatest accuracy and require the most patient and painstaking effort to obtain the desired adjustments. In adjusting the present construction, however, the change of inclination when the disks are moved is so gradual that absolute accuracy of adjustment may be obtained.

The accompanying drawings show the invention in its preferred practical form, but the invention is to be understood as fully commensurate with the appended claims.

Having thus fully described the invention, what I claim as new and desire to secure by Letters Patent is:

1. In adjusting mechanism of the character described, a stack of disks arranged in coaxial relation and adapted for relative rotation, and a body bearing against the end of the stack, each of the disks of said stack having non-parallel faces, whereby the body may be tilted into desired position by rotating the disks relative to one another.

2. In adjusting mechanism of the character described, a plurality of disks arranged in superimposed coaxial relation upon a suitable seat and each of which disks is of wedge shape cross section across at least one of its diameters, and means to maintain said disks in coaxial relation, whereby a body, seated on the disks, may be tilted into desired position by rotating the disks relatively to one another.

3. In adjusting mechanism of the character described, a suitable seat, a stack of disks positioned in coaxial relation upon said seat, and a body seated on said stack, each of the disks of said stack having non-parallel faces, whereby the body may be tilted into desired position by rotating the disks relative to one another.

4. In adjusting mechanism of the character described, a plurality of disks arranged in superimposed coaxial relation upon a suitable seat and each of which disks is of wedge shape cross section across at least one of its diameters, and means to maintain said disks in coaxial relation, a body seated on said disks, and means to maintain the body in engagement with the disks, whereby the body may be tilted into desired position by rotating the disks relatively to one another.

5. In adjusting mechanism of the character described, a suitable support, a deflector, means for adjustably securing the deflector to the support, and a plurality of superimposed coaxial disks interposed between the deflector and the support and of tapered cross section.

6. In adjusting mechanism of the character described, a suitable support, a deflector, means for adjustably securing the deflector to the support, and a plurality of superimposed coaxial disks interposed between the deflector and the support and each of which disks has substantially plane, non-parallel surfaces.

7. In adjusting mechanism of the character described, a suitable support, a plurality of superimposed coaxial disks bearing on the support, a deflector bearing on the disks, and means for holding the deflector seated on the disks and the disks seated on the support, the opposite faces of each of said disks being substantially plane, non-parallel surfaces.

8. In adjusting mechanism of the character described, a suitable support provided with a stud, a plurality of disks mounted for rotation on the stud in superimposed relation and the cross axial faces of each of which disks are substantially, plane, non-parallel surfaces, and a deflector bearing upon said disks.

9. In adjusting mechanism of the character described, a suitable support provided with a stud, a plurality of peripherally castellated disks mounted for rotation on the stud in superimposed relation and the cross axial faces of each of which disks are substantially plane, non-parallel surfaces, a deflector, and means for securing the deflector to the support in a position to bear upon the disks.

10. In adjusting mechanism of the character described, a deflector support provided with a flat seat at the opposite sides of which are formed opposed undercut flanges at least one of which is adjustable, a deflector provided with beveled edges cooperating with said flanges, and a stack of disks positioned between the seat and the deflector and bearing against both of them, each of said disks having substantially plane, non-parallel surfaces.

In testimony whereof I have signed the foregoing specification.

WILHO A. KOSKEN.